US010633509B2

(12) United States Patent
Bauer et al.

(10) Patent No.: US 10,633,509 B2
(45) Date of Patent: Apr. 28, 2020

(54) FLAME RETARDANT MIXTURES AND PRODUCTION THEREOF

(71) Applicant: CLARIANT PLASTICS & COATINGS LTD, Muttenz (CH)

(72) Inventors: Harald Bauer, Kerpen (DE); Sebastian Höerold, Diedorf (DE); Martin Sicken, Köln (DE); Eva-Maria Leuschner, Augsburg (DE); Muriel Rakotomalala, Sankt Leon Roth (DE)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 15/560,459

(22) PCT Filed: Mar. 18, 2016

(86) PCT No.: PCT/EP2016/055948
§ 371 (c)(1),
(2) Date: Sep. 21, 2017

(87) PCT Pub. No.: WO2016/150846
PCT Pub. Date: Sep. 29, 2016

(65) Prior Publication Data
US 2018/0072865 A1  Mar. 15, 2018

(30) Foreign Application Priority Data
Mar. 25, 2015 (DE) .................. 10 2015 003 825

(51) Int. Cl.
*C08K 5/00* (2006.01)
*C07F 9/30* (2006.01)
*C09K 21/12* (2006.01)
*C08K 5/5313* (2006.01)

(52) U.S. Cl.
CPC ............ *C08K 5/0066* (2013.01); *C07F 9/301* (2013.01); *C07F 9/305* (2013.01); *C08K 5/5313* (2013.01); *C09K 21/12* (2013.01); C08J 2300/22 (2013.01); C08J 2300/24 (2013.01); C08K 2201/014 (2013.01); C08L 2201/02 (2013.01)

(58) Field of Classification Search
CPC .......................... C08K 5/0066; C08K 5/5313
See application file for complete search history.

(56) References Cited

U.S. PATENT DOCUMENTS

| 3,900,444 | A | 8/1975 | Racky et al. |
| 4,036,811 | A | 7/1977 | Noetzel et al. |
| 4,046,707 | A | 9/1977 | Smith et al. |
| 6,207,736 | B1 | 3/2001 | Nass et al. |
| 6,509,401 | B1 | 1/2003 | Jenewein et al. |
| 7,420,007 | B2 | 9/2008 | Bauer et al. |
| 7,473,726 | B2 | 1/2009 | Mitchell et al. |
| 2005/0272839 | A1 | 12/2005 | Bauer et al. |
| 2006/0074157 | A1* | 4/2006 | Bauer .............. C07F 9/301 524/115 |
| 2006/0089435 | A1 | 4/2006 | Hoerold et al. |
| 2007/0213563 | A1 | 9/2007 | Maas et al. |

FOREIGN PATENT DOCUMENTS

| DE | 2252258 | 5/1974 |
| DE | 2447727 | 4/1976 |
| DE | 19734437 A1 | 2/1999 |
| DE | 19737727 A1 | 7/1999 |
| EP | 0024167 A2 | 2/1981 |
| EP | 1544206 B1 | 7/2004 |
| EP | 1602685 A1 | 12/2005 |
| EP | 1832595 B1 | 7/2009 |
| WO | 2002/028953 A1 | 4/2002 |
| WO | 2004/016684 A1 | 2/2004 |
| WO | 2004/022640 A1 | 3/2004 |

OTHER PUBLICATIONS

International Search Report dated Jun. 20, 2016, issued in International Application No. PCT/EP2016/055948.
Written Opinion of the International Searching Authority dated Jun. 20, 2016, issued in International Application No. PCT/EP2016/055948.

* cited by examiner

Primary Examiner — Peter F Godenschwager
(74) Attorney, Agent, or Firm — Morgan, Lewis & Bockius LLP

(57) ABSTRACT

Flame retardant mixtures comprising as component (A) 30% to 99.9% by weight of dialkylphosphinic salts of the formula (II), a and b may be the same or different and are each independently 1 to 9, and where the carbon chains may be linear, branched or cyclic and M is Mg, Ca, Al, Sb, Sn, Ge, Ti, Fe, Zr, Zn, Ce, Bi, Sr, Mn, Li, Na, K and/or a protonated nitrogen base and m is 1 to 4, as component (B) 0.1% to 70% by weight of alkyl hydroxyalkylphosphinyl organylcarboxylic acid salts and/or ester salts of the formula (I) where $R_1C_yH_{2y+1}$ with $y=2$ to 8, R2, R3, R4, R5, R6 are the same or different and are each independently H, $C_xH_{2x+1}$, $C_xH_{2x-1}$, $C_xH_{2x-3}$, $C_xH_{2x}CO_2X$, $C_xH_{2x-2}CO_2X$, $C_xH_{2x-4}CO_2X$, $(C_2H_3CO_2X)_u$ and $u=0$ to 1000000, $CO_2X$, $C_xH_{2x}(P(O)(OM)R_1)$, $C_xH_{2x-2}(P(O)(OM)R_1)$ $(CO_2X)$ and/or $CH_2CO_2X$, where, in the R1, R2, R3, R4, R5 and R6 groups, the carbon chains may be linear, branched or cyclic, M' is Mg, Ca, Al, Sb, Sn, Ge, Fe, Ti, Zr, Zn, Ce, Bi, Sr, Mn, Li, Na, K, H and/or N-containing cations, x is 1 to 25, X is H, M, $C_zH_{2z+1}$ and z is 1 to 8, with the proviso that at least one of the R2, R3, R4, R5, R6 groups is not H, and the compounds of formula (II) and formula (I) are different compounds.

23 Claims, No Drawings

FLAME RETARDANT MIXTURES AND PRODUCTION THEREOF

The invention pertains to flame retardant mixtures and production thereof.

In accordance with the prior art, dialkylphosphinic salts (also referred to below as phosphinates) are used as halogen-free flame retardants in flame retardant mixtures (DE-A-2 252 258 and DE-A-2 447 727). Certain dialkylphosphinic salts are used with preference on account of their low adverse impact on the mechanical properties of the thermoplastic molding compositions.

Synergistic combinations of phosphinates with certain nitrogen-containing compounds, especially with melamine derivatives, are more effective flame retardants across a whole range of polymers than are the phosphinates alone (WO-A-2002/28953, WO-A-1997/01664 and also DE-A-19734437 and DE-A-19737727).

It has further been found that the flame retardancy effect of the various phosphinates in thermoplastic polymers can also be improved significantly by additions of small amounts of mineral or inorganic compounds which contain no nitrogen, and that the stated additions are able to improve the flame retardancy effect of phosphinates in combination with nitrogen-containing synergists (EP-A-0024167, WO-A-2004/016684).

In the use of phosphinate-containing flame retardant systems, especially at processing temperatures above 300° C., there was initially partial polymer degradation, discoloration of the polymer, and development of smoke during processing. These difficulties could be halted, however, by adding basic or amphoteric oxides, hydroxides, carbonates, silicates, borates or stannates (WO-A-2004/022640).

As observed above, the flame retardant mixtures known to date with dialkylphosphinic salts as flame retardants exhibit a certain chemical interaction with the polymer when both together are processed into flame-retardant polymer molding compositions.

The properties of the dialkylphosphinic salts are improved if they further comprise telomers (EP-B-1544206). The term "telomers" here embraces compounds which are used in the telomerization ("multiplication") of short-chain olefins as employed in the preparation of dialkylphosphinic salts.

U.S. Pat. No. 4,046,707 treats acrylic acids with hypophosphorous acid. Obtained therein are compounds of alkyl-, cycloalkyl-, aryl- or aralkyl-hydrophosphinylorganylcarboxylic acid or ester type, described therein as being telomeric. They are used from aqueous systems, in order to prevent crust-forming salts, and in chemical and physical terms are completely different from the telomeric compounds of dialkylphosphinic salt type according to the present invention.

It is an object of the present invention to provide flame retardant mixtures which exhibit particularly relatively non-disadvantageous interactions with the respective polymer in the course of processing to form flame-retardant polymer molding compositions.

Flame-retardant polymer molding compositions are processed customarily by injection molding to give the corresponding flame-retardant polymer moldings. The interaction described above is detrimental to the strength of the resultant flame-retardant polymer molding. The strength may be measured, for example, through the notched impact toughness. In the case of injection molding, inadequate strength is manifested in shattering of the moldings on ejection from the injection molding machine. The failure rate may make up a percentage of up to two digits, a situation in which the process is no longer technically and economically rational.

It is an object of the present invention, therefore, to provide flame retardant mixtures which exert a particular stabilizing effect on the polymer, hence exhibiting high polymer compatibility and leading to products with an enhanced stability overall.

This object is achieved by means of flame retardant mixtures comprising as component (A) 30 to 99.9 wt % of dialkylphosphinic salts of the formula (II)

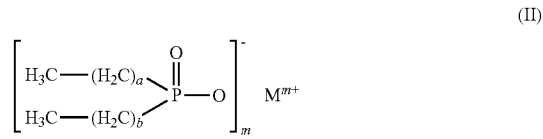

(II)

where a and b may be identical or different and, independently of one another, are each 1 to 9, and where the carbon chains may be linear, branched or cyclic, and M is Mg, Ca, Al, Sb, Sn, Ge, Ti, Fe, Zr, Zn, Ce, Bi, Sr, Mn, Li, Na, K and/or a protonated nitrogen base, and m is 1 to 4, as component (B) 0.1 to 70 wt % of alkyl-hydroxyalkylphosphinyl-organylcarboxylic salts and/or ester salts of the formula (I)

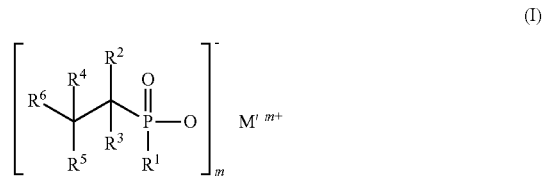

(I)

where $R^1$ is $C_yH_{2y+1}$ with y=2 to 8, $R^2$, $R^3$, $R^4$, $R^5$, and $R^6$ are identical or different and, independently of one another, are H, $C_xH_{2x+1}$, $C_xH_{2x-1}$, $C_xH_{2x-3}$, $C_xH_{2x}CO_2X$, $C_xH_{2x-2}CO_2X$, $C_xH_{2x-4}CO_2X$, $(C_2H_3CO_2X)_u$ and u=0 to 1 000 000, $CO_2X$, $C_xH_{2x}(P(O)(OM)R^1)$, $C_xH_{2x-2}(P(O)(OM)R^1)(CO_2X)$, and/or $CH_2CO_2X$, where the carbon chains in the groups $R^1$, $R^2$, $R^3$, $R^4$, $R^5$, and $R^6$ may be linear, branched, or cyclic, M' is Mg, Ca, Al, Sb, Sn, Ge, Fe, Ti, Zr, Zn, Ce, Bi, Sr, Mn, Li, Na, K, H and/or N-containing cations x is 1 to 25, X is H, M or $C_zH_{2z+1}$, and z is 1 to 8, with the proviso that at least one of the groups $R^2$, $R^3$, $R^4$, $R^5$, and $R^6$ is not H, and the compounds of the formula (II), and formula (I) are different compounds.

The flame retardant mixtures preferably comprise as component (A) 50 to 99.9 wt % of dialkylphosphinic salts of the formula (II), and as component (B) 0.1 to 50 wt % of alkyl-hydroxyalkylphosphinyl-organylcarboxylic salts and/or ester salts of the formula (I).

More preferably, the flame retardant mixtures comprise as component (A) 90 to 99.8 wt % of dialkylphosphinic salts of the formula (II), and as component (B) 0.2 to 10 wt % of alkyl-hydroxyalkylphosphinyl-organylcarboxylic salts and/or ester salts of the formula (I).

Preferably, a and b in formula (II) may be identical or different and, independently of one another, may each be 1, 2 or 3.

More preferably, a and b in formula (II) are identical and are each 1.

The flame retardant mixtures of the invention preferably further comprise telomers.

The flame retardant mixtures of the invention then preferably comprise as component (A) 30 to 99.8 wt % of dialkylphosphinic salts of the formula (II), as component (B) 0.1 to 50 wt % of alkyl-hydroxyalkylphosphinyl-organylcarboxylic salts and/or ester salts of the formula (I), and as component (C) 0.1 to 20 wt % of telomers of the formula (III)

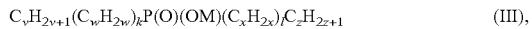

$$C_vH_{2v+1}(C_wH_{2w})_kP(O)(OM)(C_xH_{2x})_lC_zH_{2z+1} \qquad (III),$$

in which, independently of one another in formula (III),
v is 2 to 9,
w is 2 to 9,
x is 2 to 9,
z is 2 to 9,
k is 0 to 9,
l is 0 to 9, and
M is H, Mg, Ca, Al, Sb, Sn, Ge, Ti, Zr, Zn, Ce, Bi, Sr, Mn, Li, Na and/or K, and the groups $C_vH_{2v+1}$, $(C_wH_{2w})_k$, $(C_xH_{2x})_l$, and $C_zH_{2z+1}$ may be linear, branched or cyclic, and where the compounds of the formula (I), (II), and (III) are each different.

The flame retardant mixtures of the invention then more preferably comprise as component (A) 74.5 to 97 wt % of dialkylphosphinic salts of the formula (II), as component (B) 2.5 to 25.5 wt % of alkyl-hydroxyalkylphosphinyl-organylcarboxylic salts and/or ester salts of the formula (I), and as component (C) 0.5 to 4.8 wt % of telomers of the formula (III).

Preferably M' in formula (I) is Al, Sb, Sn, Ge, Ti, Fe, Zr, Zn, Ce, Bi, and/or Mn.

Preferably in formula (I)
$R^1$ is $C_yH_{2y+1}$ with y=2 to 8,
$R^2$ is H, $C_xH_{2x+1}$, $C_xH_{2x-1}$, $C_xH_{2x-3}$, $CO_2X$, $C_xH_{2x}(P(O)(OM)R^1)$,
$R^3$ is H or $CH_3$,
$R^4$ is $CO_2X$, $C_xH_{2x}CO_2X$, $C_xH_{2x-2}CO_2X$, $C_xH_{2x-4}CO_2X$, $C_xH_{2x-2}(P(O)(OM)R^1)(CO_2X)$,
$R^5$ is H or $CH_2CO_2X$,
$R^6$ is H,
M is Mg, Ca, Al, Sb, Sn, Ge, Fe, Ti, Zr, Zn, Ce, Bi, Sr, Mn, Li, Na, K, H, and N-containing cations, and
x, X, and z have the same definition as in claim 1, i.e.,
x is 1 to 25,
X is H, M or $C_zH_{2z+1}$, and
z is a number from 1 to 8.

Preferably in formula (I) as well
$R^1$ is $C_yH_{2y+1}$ with y=2 to 8,
$R^2$ is $C_xH_{2x}CO_2X$, $C_xH_{2x-2}CO_2X$, $C_xH_{2x-4}CO_2X$, $C_xH_{2x-2}(P(O)(OM)R^1)(CO_2X)$,
$R^3$ and $R^5$ are each H,
$R^4$ is $C_xH_{2x+1}$, $C_xH_{2x-1}$, $C_xH_{2x-3}$, $C_xH_{2x}(P(O)(OM)R^1)$,
$R^6$ is H,
M is Mg, Ca, Al, Sb, Sn, Ge, Fe, Ti, Zr, Zn, Ce, Bi, Sr, Mn, Li, Na, K, H and/or N-containing cations, and
x, X, and z have the same definition as in claim 1, i.e.,
x is 1 to 25,
X is H, M or $C_zH_{2z+1}$, and
z is a number from 1 to 8.

In another embodiment, in formula (I)
$R^1$ is ethyl,
$R^2$ is H, $CO_2X$, $C_2H_5$, $C_5H_9$, $C_8H_{13}$, $C_8H_{17}$, $C_5H_{11}$, $C_8H_{15}$, $C_8H_{15}(P(O)(OM)R^1)$, $C_7H_{14}CO_2X$, $C_{10}H_{18}CO_2X$, $C_{10}H_{20}CO_2X$, $C_{13}H_{22}CO_2X$,
$R^3$ is H or $CH_3$,
$R^4$ is $CO_2X$, $C_{10}H_{18}CO_2X$, $C_7H_{14}CO_2X$, $C_{10}H_{20}CO_2X$, $C_{13}H_{22}CO_2X$, $C_5H_9$, $C_5H_{11}$, $C_8H_{13}$, $C_8H_{15}$, $C_8H_{17}$, $C_{10}H_{17}(P(O)(OM)R^1)CO_2X$ with X=H or methyl,
$R^5$ is H or $CH_2CO_2X$,
$R^6$ is H,
M is Al, Fe, Ti, Zn, Na or H, and
X is H, M or $CH_3$.

In a further embodiment, in formula (I)
$R^1$ is ethyl,
$R^2$ is $C_{10}H_{18}CO_2X$, $C_7H_{14}CO_2X$, $C_{10}H_{20}CO_2X$, $C_{13}H_{22}CO_2X$, $C_{10}H_{17}(P(O)(OM)R^1)CO_2X$,
$R^3$ is H,
$R^4$ is $C_2H_5$, $C_5H_9$, $C_8H_{17}$, $C_5H_{11}$, $C_8H_{15}$, $C_8H_{15}(P(O)(OM)R^1)$, $C_8H_{13}$,
$R^5$ is H,
$R^6$ is H,
M is Al, Fe, Ti, Zn, Na or H, and
X is H, M or $CH_3$.

As component (B) it is also possible preferably to use alkyl-hydroxyphosphinyl-organylcarboxylic salts and/or ester salts of type $R^1P(O)M$-$CHR^7$—$CO_2H$ with $R^7$=$CH_3$ and $R^1$=$C_2H_5$.

Component (B) preferably comprises Al, Zn, Fe and/or Ti salts of ethyl(oleyl)phosphinic acid, of carboxyoctadecyl(ethyl)phosphinic acid, of ethyl(methyloleyl)phosphinic acid, of methylcarboxyoctadecyl(ethyl)phosphinic acid, of ethyl(linolyl)phosphinic acid, of carboxyoctadecenyl(ethyl) phosphinic acid, of carboxyethyl(ethyl)phosphinic acid, of 1-carboxy-1-methylmethyl(ethyl)phosphinic acid, of ethyl (polyacryloyl)phosphinic acid, of 1,2-dicarboxyethyl(ethyl) phosphinic acid, of 2-carboxy-2-hydroxyethylphosphinylpropionic acid, of 2-carboxy-3-hydroxyethylphosphinylbutanoic acid, of 2,3-dicarboxypropyl(ethyl)phosphinic acid, of 2-carboxy-2-hydroxyethylphosphinylbutanoic acid and/or of 1,2-dicarboxy-1-methyl(ethyl)phosphinic acid.

Component (B) more preferably comprises Al and/or Zn salts of carboxyoctadecyl(ethyl)phosphinic acid, of methylcarboxyoctadecyl(ethyl)phosphinic acid, of carboxyoctadecenyl(ethyl)phosphinic acid, of carboxyethyl(ethyl)phosphinic acid, of ethyl(polyacryloyl)phosphinic acid, of 1,2-dicarboxyethyl(ethyl)phosphinic acid, of ethyl(itaconyl) phosphinic acid, of 2,3-dicarboxypropylphosphinic acid and/or of 1,2-dicarboxy-1-methyl(ethyl)phosphinic acid.

The telomers are preferably ethylbutylphosphinic acid, dibutylphosphinic acid, ethylhexylphosphinic acid, butylhexylphosphinic acid, ethyloctylphosphinic acid, sec-butyl (ethyl)phosphinic acid, 1-ethylbutyl(butyl)phosphinic acid, ethyl(1-methylpentyl)phosphinic acid, di-sec-butylphosphinic acid (di-1-methylpropylphosphinic acid), propyl(hexyl)phosphinic acid, dihexylphosphinic acid, hexyl(nonyl) phosphinic acid and/or dinonylphosphinic acid and/or salts thereof.

The telomers more particularly are ethylbutylphosphinic acid, ethyl-n-butylphosphinic acid, ethyl-sec-butylphosphinic acid, propyl(hexyl)phosphinic acid, dihexylphosphinic acid and/or salts thereof.

The flame retardant mixtures of the invention preferably further comprise additives which comprise antioxidants, antistats, blowing agents, other flame retardants, heat stabilizers, impact modifiers, process auxiliaries, lubricants, light stabilizers, antidripping agents, compatibilizers, reinforcing agents, fillers, seed-forming agents, nucleating agents, laser marking additives, hydrolysis stabilizers, chain extenders, color pigments, plasticizers and/or plastifying agents and others.

The mean particle size $d_{50}$ of the flame retardant mixtures of the invention is preferably 0.02-900 µm, their bulk density is preferably 100 to 680 g/L, and their color value (Hunter L value) is preferably 93 to 97.

The mean particle size $d_{50}$ of the flame retardant mixtures of the invention is preferably 0.1-110 µm and their bulk density is preferably 250 to 620 g/L.

The invention also relates to a process for producing flame retardant mixtures as claimed in one or more of claims 1 to 21, wherein
a) a water-soluble salt of hypophosphorous acid or the acid itself is reacted in a ratio of 100 mol:0.1 mol to 50 mol:50 mol with an alkenecarboxylic acid,
b) the product from step a) is reacted with an olefin in a ratio of 100 mol of phosphinic acid source: 1800 to 50 mol of olefin,
c) and the product from step b) is reacted with a metal salt to give a flame retardant mixture composed of dialkylphosphinic salts of the formula (II) and alkyl-hydroxyalkylphosphinyl-organylcarboxylic salts and/or ester salts of the formula (I).

The invention relates, moreover, to a process for producing flame retardant mixtures of the invention, wherein
a) a salt of hypophosphorous acid having a solubility in water of less than 10 g/100 g, or the acid itself, is reacted in a ratio of 100 mol:0.1 mol to 50 mol:50 mol with an alkenecarboxylic acid and
b) the product from step a) is further reacted with an olefin in a ratio of 100 mol of water-soluble salt of hypophosphorous acid or the acid itself: 1800 to 50 mol.

The invention further relates to a process for producing flame retardant mixtures of the invention, as claimed in one or more of claims 1 to 21, wherein
a) a water-soluble salt of hypophosphorous acid or the acid itself is reacted in a ratio of 100 mol:0.1 mol to 50 mol:50 mol with an alkenecarboxylic acid,
b) the product from step a) is further reacted with an olefin in a ratio of 100 mol of water-soluble salt of hypophosphorous acid or the acid itself: 99.9 to 50 mol of olefin,
c) the product from step b) is reacted with a metal salt to give the flame retardant mixture of the invention, and
d) telomers are physically admixed.

The flame retardant mixtures of the invention are used preferably as a flame retardant, more particularly as a flame retardant for clear varnishes and intumescent coatings, as a flame retardant for wood and other cellulosic products, as a reactive and/or nonreactive flame retardant for polymers, for production of flame-retardant polymer molding compositions, for production of flame-retardant polymer moldings and/or for rendering polyester and pure and blended cellulose fabrics flame-retardant by impregnation; as an intermediate; for further syntheses, as a binder, as a crosslinker and/or accelerator in the curing of epoxy resins, polyurethanes, and unsaturated polyester resins, as a polymer stabilizer, as a crop protectant, as a sequestrant, as a mineral oil additive, as a corrosion inhibitor, in laundry detergent and cleaning product applications and/or in electronic applications.

With particular preference the flame retardant mixtures of the invention are used in or for plug connectors, current-bearing components in power distributors (residual current protection), circuit boards, potting compounds, power plugs, circuit breakers, lamp housings, LED lamp housings, capacitor housings, coil elements, ventilators, grounding contacts, plugs, in/on circuit boards, housings for plugs, cables, flexible printed circuit boards, charging cables, motor covers, textile coatings, and other products.

The invention also relates to flame-retardant thermoplastic or thermoset polymer molding compositions comprising 0.5 to 45 wt % of flame retardant mixtures as claimed in one or more of claims 1 to 21, 10 to 95 wt % of thermoplastic or thermoset polymer or mixtures thereof, 0 to 55 wt % of additives, and 0 to 55 wt % of filler and/or reinforcing materials, the sum of the components being 100 wt %.

The invention relates more particularly to flame-retardant thermoplastic or thermoset polymer moldings, films, filaments, and fibers, comprising 5 to 30 wt % of flame retardant mixtures as claimed in one or more of claims 1 to 21, 20 to 95 wt % of thermoplastic or thermoset polymer or mixtures thereof, 5 to 55 wt % of additives, and 10 to 55 wt % of filler and/or reinforcing materials, the sum of the components being 100 wt %.

Surprisingly it has been found that the flame retardant mixtures of the invention, of dialkylphosphinic salts with alkyl-hydroxyalkylphosphinyl-organylcarboxylic salts and ester salts, are favorable for low interaction with the polymer.

In the alkyl-hydroxyalkylphosphinyl-organylcarboxylic salts and ester salts used in accordance with the invention, the phosphinic acid groups are present preferably as salts, and the carboxylic acid groups preferably as carboxylic acids.

In an alternative embodiment, in the alkyl-hydroxyalkylphosphinyl-organylcarboxylic salts and ester salts used in accordance with the invention, the phosphinic acid groups are in the form of salts, and the carboxylic acid groups are preferably in the form of carboxylic salts.

In a further alternative embodiment, in the alkyl-hydroxyalkylphosphinyl-organylcarboxylic salts and ester salts used in accordance with the invention, the phosphinic acid groups are in the form of salts, and the carboxylic acid groups are preferably in the form of carboxylic esters.

In the alkyl-hydroxyalkylphosphinyl-organylcarboxylic salts and ester salts used in accordance with the invention, the chains of the organyl radicals are preferably saturated.

In a further alternative embodiment, in the alkyl-hydroxyalkylphosphinyl-organylcarboxylic salts and ester salts used in accordance with the invention, the chains of the organyl radicals are mono- or polyunsaturated.

In a further alternative embodiment, in the alkyl-hydroxyalkylphosphinyl-organylcarboxylic salts and ester salts used in accordance with the invention, the chains of the organyl radicals carry further alkyl-hydroxyphosphinyl groups.

Component (A) preferably comprises the Al, Zn, Fe and/or Ti salts of diethylphosphinic acid, of dipropylphosphinic acid, of dibutylphosphinic acid and/or of dihexylphosphinic acid.

Preferred dialkylphosphinic salts are diethylphosphinic salts.

Preferred dialkylphosphinic salts are those with M as Mg, Ca, Al, Sb, Sn, Ge, Ti, Zr, Zn, Ce, Bi, Sr, Mn, Li, Na and/or K.

Particularly preferred diethylphosphinic salts are those with M as Al, Ti, Zn and/or Fe.

Telomers come about on addition reaction of an olefin onto the hypophosphite ion.

A plurality of molecules of olefin, rather than just two, are added onto the dialkylphosphinate ion. Accordingly, one or both alkyl chains are extended by one or more further olefin units.

The telomers are preferably in the form of Al, Ti, Fe and/or Zn salts.

With preference in formula (III)
v is 2 to 4
w is 2 to 4
x is 2 to 4
y is 2 to 4
l is 0 to 2
k is 0 to 2.

The telomer anions may preferably be incorporated into the crystal lattice of a dialkylphosphinic salt.

Telomer anions may further be present preferably as independent chemical species in a co-precipitated mixture of dialkylphosphinic salt and telomer salt. As a result of the co-precipitation, they are distributed uniformly with the dialkylphosphinate salt or with the mixture of dialkylphosphinic salt and alkyl-hydroxyphosphinyl-organylcarboxylic salt and/or ester salt.

Telomer anions may also be present as a physical mixture with the dialkylphosphinic salt or with the mixture of dialkylphosphinic salt with alkyl-hydroxyalkylphosphinyl-organylcarboxylic salt and/or ester salt.

Telomers are phosphorus-containing compounds. Their content is expressed as a percentage of all phosphorus-containing ingredients (P-%). It is determined by means of $^{31}$P NMR.

In the process for producing the flame retardant mixtures of the invention, preference is given to using alkenecarboxylic acids of type

where
X is H,
M is $C_zH_{2z+1}$,
x is 1 to 25, and
z is 1 to 8.

Alkenecarboxylic acids which can be used in accordance with the invention are mono- or polyunsaturated alkenemonocarboxylic acids, alkenedicarboxylic acids, alkeneoligocarboxylic acids and/or alkenepolycarboxylic acids.

They include, in particular, acrylic acid, maleic acid, itaconic acid, fatty acids such as, for example, 10-undecenoic acid, myrisoleic acid, palmitoleic acid, 6-octadenoic acid, elaidic acid, 9,12-octadecadienoic acid, octadecatrienoic acid, oleic acid, linoleic acid, linolenic acid, eicosenoic acid, arachidonic acid, 13-docosenoic acid, docosapentaenoic acid, omega-6 fatty acids, omega-9 fatty acids, mixtures such as linseed oil, and others.

It is also possible to use precursors such as maleic anhydride, etc., which are able to react in situ to give alkenecarboxylic acids such as maleic acid, for example.

Preferred raw materials for the alkenecarboxylic acids which can be used in accordance with the invention (oleic acid fraction expressed in percent in each case) are olive oil (70-75%), groundnut oil (50-70%), rapeseed oil: HEAR varieties (12-24%), LEAR varieties (50-65%), avocado oil (44-76%), goose fat (41-72%), palm oil (37-42%), grape kernel oil (58-78%), safflower oil (55-81%), hemp oil (about 50%), soyabean oil (49-57%), cottonseed oil (45-58%), wheat germ oil (40-55%), corn germ oil (34-62%), sunflower oil (20-75%), rapeseed oil (18-30%), dragon's head oil (up to 70%), chia oil (about 60%), perilla oil (31-42%), linseed oil (56-71%), hemp oil (28%), walnut oil (about 15%), rapeseed oil (5-16%), soyabean oil (4-11%), grape kernel oil (<1% linolenic acid, 72% linoleic acid), ground horsemeat (about 30%), lard (<1.5%), and others.

In the process for producing the flame retardant mixtures of the invention, preference is given to using ethene, propene, 1-butene, 2-butene, 1-pentene, 1-hexene, and 1-octene as olefin. The nature of the olefin has a corresponding influence on the nature and amount of the resultant telomers.

Particularly preferred for use as olefin are ethylene or propene.

In the case of ethylene as olefin, telomers formed are preferably ethylbutylphosphinic acid, dibutylphosphinic acid, ethylhexylphosphinic acid, butylhexylphosphinic acid, ethyloctylphosphinic acid, and so on, and/or their salts.

In the case of propene as olefin, the sequence is analogous.

As a result of the stereochemistry, the formation of branched alkyl chains is possible as well, and hence, for example, sec-butyl(ethyl)phosphinate, 1-ethylbutyl(butyl)phosphinate, ethyl(1-methylpentyl)phosphinate, di-sec-butylphosphinate (di-1-methylpropylphosphinate), and similar telomer products may be formed.

For the stability of the flame retardant mixture of the invention with respect to separation during transport processes, especially when accompanied by shaking, low particle sizes are preferred.

Preference is given to mean particle sizes $d_{50}$ of

| | |
|---|---|
| 0.02-900 μm | for the mixture of dialkylphosphinic salt and alkyl-hydroxyphosphinyl-alkylcarboxylic salt/ester salt, |
| 0.02-900 μm | for the mixture of dialkylphosphinic salt, alkyl-hydroxyphosphinyl-alkylcarboxylic salt/ester salt, and telomers, and |
| 0.02-900 μm | for the telomers. |

Particular preference is given to mean particle sizes $d_{50}$ of

| | |
|---|---|
| 0.1-110 μm | for the mixture of dialkylphosphinic salt and alkyl-hydroxyphosphinyl-alkylcarboxylic salt/ester salt, |
| 0.1-110 μm | for the mixture of dialkylphosphinic salt, alkyl-hydroxyphosphinyl-alkylcarboxylic salt/ester salt, and telomers, and |
| 0.1-110 μm | for the telomers. |

One preferred process for producing flame retardant mixtures of the invention is distinguished by the fact that
a) in process stage 1 a water-soluble salt of hypophosphorous acid, or the acid itself, is reacted in a ratio of 100 mol:0.1 mol to 50 mol:50 mol with an alkenecarboxylic acid,
b) in process stage 2 the product is further reacted with an olefin in the ratio of 100 mol of phosphinic acid source: 99.9 to 50 mol of olefin,
c) in process stage 3—if the hypophosphorous acid is used wholly or partially—there is optional neutralization, and
d) in process stage 4 the product from step c) is reacted with a metal salt to give the flame retardant mixture of the invention.

In process stage 1, the water-soluble salt of hypophosphorous acid, or the acid itself, is reacted in substoichiometric amount with the alkenecarboxylic acid. This produces phosphinic acid/alkenecarboxylic acid monoadducts (mono-alkylphosphinic acids/salts). In addition there is water-soluble salt of hypophosphorous acid, or the hypophosphorous acid itself.

In process stage 2, phosphinic acid/alkenecarboxylic acid monoadducts are reacted with olefin to give alkyl-hydroxyphosphinyl-alkylcarboxylic acids.

Water-soluble salt of hypophosphorous acid, or the acid itself, which has not been converted in process stage 1 is reacted to form dialkylphosphinic acids or salts thereof. In this process stage, moreover, telomers are formed.

In process stage 3, the derivatives obtained can be mutually interconverted. In other words, the dialkylphosphinic acids can be converted into their salts, and/or dialkylphosphinic salts can be converted into other dialkylphosphinic salts; alkyl-hydroxyphosphinyl-alkylcarboxylic salts can be converted into other alkyl-hydroxyphosphinyl-alkylcarboxylic salts; telomers with a free phosphinic acid group can be converted into their salts, and/or phosphinic salts can be converted into other phosphinic salts.

If the hypophosphorous acid is wholly or partially used, phosphinic salts can be obtained by neutralization. These salts are preferably water-soluble. Preference is given to Na, K, Ca, and Mg salts.

If the phosphinic acid source is a phosphinic ester, phosphinic salts can be obtained by hydrolysis with alkalis. These salts are preferably water-soluble. Preference is given to Na, K, Ca, and Mg salts.

In process stage 4, the flame retardant mixtures of the invention are obtained, comprising dialkylphosphinic salts, alkyl-hydroxyphosphinyl-alkylcarboxylic salts and/or ester salts, and telomers.

Where salts having a solubility of more than 10 g/100 g are present in process stage 3, they are converted by using suitable metal salts into salts having a solubility of less than 10 g/100 g. Where acids are present in process stage 3, they are converted by using suitable metal hydroxides into salts having a solubility of less than 10 g/100 g.

An alternative process for producing flame retardant mixtures of the invention is distinguished by the fact that
a) in process stage 1, a low-solubility, water-soluble salt of hypophosphorous acid, or the acid itself, is reacted in a ratio of 100 mol:0.1 mol to 50 mol:50 mol with an alkenecarboxylic acid and
b) in process stage 2, further reaction takes place with an olefin in the ratio of 100 mol of water-soluble salt of hypophosphorous acid, or the acid itself: 99.9 to 50 mol.

Low-solubility salts of hypophosphorous acid which can be used in accordance with the invention are aluminum hypophosphite, calcium hypophosphite, and magnesium hypophosphite.

A further process for producing flame retardant mixtures of the invention is distinguished by the fact that
a) in process stage 1, a water-soluble salt of hypophosphorous acid, or the acid itself, is reacted in a ratio of 100 mol:0.1 mol to 50 mol:50 mol with an alkenecarboxylic acid
b) in process stage 2, further reaction takes place with an olefin in the ratio of 100 mol of water-soluble salt of hypophosphorous acid, or the acid itself: 99.9 to 50 mol of olefin, without telomers being formed
c) in process stage 3—if the hypophosphorous acid is used wholly or partially—neutralization optionally takes place
d) in process stage 4, reaction takes place with a metal salt to give the flame retardant mixture of the invention, and
e) in process stage 5, telomers are physically admixed.

The reaction in process stage 1 takes place preferably within from 2 to 12 h and at 20 to 120° C.

More preferably the reaction in process stage 1 takes place within from 4 to 8 h and at 80 to 120° C.

The reaction in process stage 2 takes place preferably within from 0.5 to 24 h and at 20 to 120° C.

More preferably the reaction in process stage 2 takes place within from 2 to 5 h and at 80 to 120° C.

The reaction in process stage 3 takes place preferably within from 0.1 to 24 h and at 20 to 120° C.

More preferably process stage 4 takes place for 1 to 5 h and 80 to 100° C.

The concentration of flame retardant mixture in solvent is preferably 1 to 30 wt %, more preferably 5 to 20 wt %.

Solvent is preferably water, acetic acid, methanol, ethanol and/or toluene.

The metal salt stated in process stage 4 in each case preferably comprises compounds of aluminum, of zinc, of titanium and/or of iron with inorganic anions of the seventh main group (halides), for example fluorides, chlorides, bromides, iodides; with anions of the oxo acids of the seventh main group (hypohalites, halites, halogenates, e.g., iodate, perhalogenates, e.g., perchlorate); with anions of the sixth main group (chalcogenides), for example oxides, hydroxides, peroxides, superoxides; with anions of the oxo acids of the sixth main group (sulfates, hydrogensulfates, sulfate hydrates, sulfites, peroxosulfates); with anions of the fifth main group (pnicogenides), for example nitrides, phosphides; with anions of the oxo acids of the fifth main group (nitrate, nitrate hydrates, nitrites, phosphates, peroxophosphates, phosphites, hypophosphites, pyrophosphates); with anions of the oxo acids of the fourth main group (carbonates, hydrogencarbonates, hydroxide carbonates, carbonate hydrates, silicates, hexafluorosilicates, hexafluorosilicate hydrates, stannates); with anions of the oxo acids of the third main group (borates, polyborates, peroxoborates); with anions of the pseudohalides (thiocyanates, cyanates, cyanides); with anions of the oxo acids of the transition metals (chromates, chromites, molybdates, permanganate); with organic anions from the group of the mono-, di-, oligo-, and polycarboxylic acids (salts of formic acid (formates), of acetic acid (acetates, acetate hydrates), of trifluoroacetic acid (trifluoroacetate hydrates), propionates, butyrates, valerates, caprylates, oleates, stearates, of oxalic acid (oxalates), of tartaric acid (tartrates), citric acid (citrates, basic citrates, citrate hydrates), benzoic acid (benzoates), salicylates, lactic acid (lactate, lactate hydrates), acrylic acid, maleic acid, succinic acid, of amino acids (glycine), of acidic hydroxo functions (phenoxides, etc.), para-phenolsulfonates, para-phenolsulfonate hydrates, acetylacetonate hydrates, tannates, dimethyldithiocarbamates, trifluoromethanesulfonate, alkylsulfonates and/or aralkylsulfonates).

In one or more than one further process stage, the flame retardant mixtures of the invention may be mixed physically with one or more synergists.

The flame retardant mixture of the invention preferably comprises:

| | |
|---|---|
| 3-98.98 wt % | dialkylphosphinic salt |
| 0.01-10 wt % | telomers |
| 0.01-25 wt % | alkyl-hydroxyalkylphosphinyl-organylcarboxylic salts and ester salts thereof, and |
| 0.1-50 wt % | synergists. |

Preferably used in accordance with the invention as synergists are melamine phosphate, dimelamine phosphate, pentamelamine triphosphate, trimelamine diphosphate, tetrakismelamine triphosphate, hexakismelamine pentaphosphate, melamine diphosphate, melamine tetraphosphate, melamine pyrophosphate, melamine polyphosphates, melam polyphosphates, melem polyphosphates and/or melon polyphosphates.

Further preferred as synergists are melamine condensation products such as melam, melem and/or melon.

Further preferred as suitable synergists in accordance with the invention are oligomeric esters of tris(hydroxyethyl) isocyanurate with aromatic polycarboxylic acids, benzoguanamine, tris(hydroxyethyl) isocyanurate, allantoin, glycouril, melamine, melamine cyanurate, urea cyanurate, dicyandiamide and/or guanidine.

Synergists suitable in accordance with the invention are, with further preference, nitrogen-containing phosphates of the formulae

$(NH_4)_y H_{3-y} PO_4$ or $(NH_4PO_3)_z$ where
y is 1 to 3 and
z is 1 to 10 000.

Synergists particularly suitable in accordance with the invention are aluminum phosphites.

The flame-retardant polymer molding composition also preferably comprises

| | |
|---|---|
| 0.5-45 wt % | flame retardant mixture of the invention |
| 10-95 wt % | polymer or mixtures thereof, |
| 0-55 wt % | additives, and |
| 0-55 wt % | filler. |

In accordance with the invention the flame-retardant polymer composition is produced by compounding.

The flame-retardant polymer molding composition preferably comprises

| | |
|---|---|
| 5-30 wt % | flame retardant mixture of the invention, |
| 5-90 wt % | polymer or mixtures thereof, |
| 5-40 wt % | additives, and |
| 5-40 wt % | filler. |

The flame-retardant polymer molding composition also preferably comprises

| | |
|---|---|
| 5-30 wt % | flame retardant mixture of the invention, |
| 20-95 wt % | polymer or mixtures thereof, |
| 5-55 wt % | additives, and |
| 10-55 wt % | glass fibers. |

The polymers preferably originate from the group of the thermoplastic polymers such as polyester, polystyrene or polyamide, and/or from the group of the thermoset polymers.

More preferably the thermoset polymers are epoxy resins.

More preferably the thermoset polymers are epoxy resins cured using phenols, dicyandiamide, phenol derivatives (resols), alcohols and/or amines, especially phenol derivatives and dicyandiamide.

More preferably the thermoset polymers are epoxy resins cured using phenols and/or dicyandiamide and/or a catalyst.

The catalysts are preferably imidazole compounds.
The epoxy resins are preferably polyepoxide compounds.
The epoxy resins are preferably resins based on novolac.
The epoxy resins are preferably resins based on bisphenol A.

Polymers which can be used in accordance with the invention are thermoset and thermoplastic polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrol 143E (BASF)), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; high impact resistance mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates/alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, and mixtures thereof, such as are known, for example, as ABS, MBS, ASA or AES polymers.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers deriving from alpha,beta-unsaturated acids and derivatives thereof, such as polyacrylates and polymethacrylates, butyl acrylate-impact-modified polymethyl methacrylates, polyacrylamides and polyacrylonitriles and copolymers of the cited monomers with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers deriving from unsaturated alcohols and amines or from the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals, such as polyoxymethylene, and those polyoxymethylenes which comprise comonomers, for example ethylene oxide; polyacetals modified with thermoplastic polyurethanes, acrylates or MBS.

The polymers are preferably polyphenylene oxides and sulfides and mixtures thereof with styrene polymers or polyamides.

The polymers are preferably polyurethanes deriving from polyethers, polyesters and polybutadienes having terminal hydroxyl groups and from aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide), Nylon® 4/6, from DuPont), nylon 6 (polycaprolactam, poly-6-aminohexanoic acid, Nylon® 6, from DuPont, Akulon® K122, from DSM; Zytel® 7301, from DuPont; Durethan® B 29, from Bayer), nylon 6/6 (poly(N,N'-hexamethyleneadipamide), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide), Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides originating from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the abovementioned polyamides with polyolefins, olefin copolymers, ionomers or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The polymers are preferably polyureas, polyimides, polyamidimides, polyetherimides, polyesterimides, polyhydantoins, and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or with MBS.

The polymers are preferably polycarbonates and polyester carbonates.

The polymers are preferably polysulfones, polyether sulfones, and polyether ketones.

The polymers are preferably crosslinked polymers which derive from aldehydes and from phenols, urea or melamine, such as phenol-formaldehyde, urea-formaldehyde and melamine-formaldehyde resins.

The polymers are preferably drying and nondrying alkyd resins.

The polymers are preferably unsaturated polyester resins which derive from copolyesters of saturated and unsaturated dicarboxylic acids with polyhydric alcohols, and also from vinyl compounds as crosslinking agents, and also the halogen-containing, low-flammability modifications of such resins.

The polymers are preferably crosslinkable acrylic resins which derive from substituted acrylic esters, for example from epoxy acrylates, urethane acrylates or polyester acrylates.

The polymers are preferably alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the abovementioned polymers, for example PP/EPDM (polypropylene/ethylene-propylene-diene rubber), polyamide/ EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylates (polyvinyl chloride/acrylates), POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

The molding composition produced is preferably of rectangular shape with a regular or irregular base, or of cubic shape, cuboidal shape, cushion shape or prism shape.

Preferred further additives in the flame retardant mixtures of the invention are zinc compounds, e.g., zinc oxide, zinc hydroxide, tin oxide hydrate, zinc carbonate, zinc stannate, zinc hydroxystannate, basic zinc silicate, zinc phosphate, zinc borate, zinc molybdate or zinc sulfides.

Preferred further additives in the flame retardant mixtures of the invention are from the group of the carbodiimides and/or (poly)isocyanates.

Preferred further additives come from the group of the sterically hindered phenols (e.g. Hostanox® OSP 1), sterically hindered amines and light stabilizers (e.g. Chimasorb® 944, Hostavin® products), phosphonites and antioxidants (e.g. Sandostab® P-EPQ from Clariant) and release agents (Licomont® products from Clariant).

Preferred further fillers in the flame retardant mixtures of the invention are oxygen compounds of silicon, magnesium compounds, e.g. metal carbonates of metals of the second main group of the Periodic Table, magnesium oxide, magnesium hydroxide, hydrotalcites, dihydrotalcite, magnesium carbonates or magnesium calcium carbonates, calcium compounds, e.g. calcium hydroxide, calcium oxide, hydrocalumite, aluminum compounds, e.g. aluminum oxide, aluminum hydroxide, boehmite, gibbsite or aluminum phosphate, red phosphorus, zinc compounds or aluminum compounds.

Preferred further fillers are glass beads.

Glass fibers are preferably used as reinforcing materials.

Compounding units usable in accordance with the invention are multizone screw extruders having three-zone screws and/or short compression screws.

Compounding units usable in accordance with the invention are also co-kneaders, for example from Coperion Buss Compounding Systems, Pratteln, Switzerland, e.g. MDK/E46-11D, and/or laboratory kneaders (MDK 46 from Buss, Switzerland with L=11D).

Compounding units usable in accordance with the invention are twin-screw extruders, for example from Coperion Werner & Pfleiderer GmbH & Co. KG, Stuttgart (ZSK 25, ZSK 30, ZSK 40, ZSK 58, ZSK MEGAcompounder 40, 50, 58, 70, 92, 119, 177, 250, 320, 350, 380) and/or from Berstorff GmbH, Hanover, Leistritz Extrusionstechnik GmbH, Nuremberg.

Compounding units usable in accordance with the invention are ring extruders, for example from 3+Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Compounding units usable in accordance with the invention are compounders with a contrarotatory twin screw, for example Compex 37 and 70 models from Krauss-Maffei Berstorff.

Inventive effective screw lengths in the case of single-shaft extruders or single-screw extruders are 20 to 40D.

Inventive effective screw lengths (L) in the case of multizone screw extruders are, for example, 25D with intake zone (L=10D), transition zone (L=6D) and ejection zone (L=9D).

Inventive effective screw lengths in the case of twin-screw extruders are 8 to 48.

Production, processing and testing of flame-retardant polymer molding composition and polymer moldings:

The flame retardant components are mixed with the polymer pellets and any additives and incorporated via the side intake of a twin-screw extruder (model: Leistritz ZSE 27/44D) at temperatures of 230 to 260° C. (glass fiber-reinforced PBT), at 260-310° C. into PA 6,6 and at 250-275° C. into PA 6. The glass fibers were added via a second side intake. The homogenized polymer strand was drawn off, cooled in a water bath and then pelletized to give flame-retardant polymer molding compositions.

After sufficient drying, the molding compositions were processed on an injection molding machine (model: Arburg 320 C Allrounder) at melt temperatures of 240 to 300° C. to give flame-retardant polymer moldings. They can be used as test specimens and tested for flame retardancy and classified by the UL 94 test (Underwriter Laboratories).

Identification of the telomers and determination of the composition of the flame retardant mixtures of the invention:

The $^{31}P$ NMR spectra are measured using a Jeol JNM-ECS-400 instrument, a 400 MHz NMR instrument from JEOL (Germany) GmbH. A sample of 100-150 mg is dissolved in 2 ml of 10 wt % $NaOD/D_2O$ by mild heating of the sample to about 40° C. The measurement is carried out in the {1H} decoupling mode with 2048 scans.

With the aid of table 6, the $^{31}P$ NMR signals of the telomers can be taken from a $^{31}P$ NMR spectrum. The $^{31}P$ NMR integration values give the percentage fraction of $^{31}P$ nuclei, based on all $^{31}P$ nuclei in the sample. These integrations are multiplied for each substance by an individual factor (f=MW (telomer in the form of the Al salt) divided by 3*AW(phosphorus)) [MW: molecular weight, AW: atomic weight].

All such values for the dialkylphosphinic salt, all telomer additions, and hydroxyalkylphosphinyl-organylcarboxylic salts and their ester salts are added up to give an intermediate total. The value for the dialkylphosphinic salt, all telomer additions, and alkyl-hydroxyalkylphosphinyl-organylcarboxylic salts and their ester salts are each multiplied by 100 and divided by the intermediate total. In this way the amount in wt % in the flame retardant mixture of the invention is obtained.

TABLE 6

31P NMR chemical shift of telomers

| Telomer | 31P NMR chem. shift [ppm] |
|---|---|
| Aluminum tris(diethylphosphinate) | 50.435-49.785 |
| Aluminum tris(sec-butylethylphosphinate) | 51.830-51.752 |
| Aluminum tris(n-butylethylphosphinate) | 49.031-48.866 |
| Aluminum tris(n-hexylethylphosphinate) | about 48.693 |
| Aluminum tris(sec-hexylethylphosphinate) | about 51.72 |
| Aluminum tris(di-n-butylphosphinate) | about 47.887 |
| Aluminum tris(di-sec-butylphosphinate) | about 52.861 |
| Aluminum tris(n-octylethylphosphinate) | about 46.795 |
| Aluminum (ethylene-1,2-diethylphosphinate) | about 47.731 |
| Aluminum (ethylene-1,2-dibutylphosphinate) | about 46.630 |

The signal positions of the substances in table 6 are determined by measurement of reference samples synthesized individually.

Determination of flame retardancy properties on the flame-retardant polymer moldings:

The test specimens, 1.6 mm thick, are tested and classified for flame retardancy (flame resistance) by means of the UL 94 test (Underwriter Laboratories).

The UL 94 fire classifications are as follows:

V-0 afterflame time never longer than 10 sec, total of afterflame times for 10 flame applications not more than 50 sec, no flaming drops, no complete consumption of the specimen, afterglow time for specimens never longer than 30 sec after end of flame application V-1 afterflame time never longer than 30 sec after end of flame application, total of afterflame times for 10 flame applications not more than 250 sec, afterglow time for specimens never longer than 60 sec after end of flame application, other criteria as for V-0

V-2 cotton indicator ignited by flaming drops, other criteria as for V not classifiable (unclass.): does not comply with fire classification V-2.

Notched Impact Toughness

The notched impact toughness is determined by positioning a centrally notched polymer molding on two abutments and fracturing it centrally using a pendulum hammer.

Polymer Compatibility and DMT Method

The method is intended to simulate the degradation of polybutylene terephthalate (PBT) polymer by flame retardants. Instead of the ester bond in the polymer, it is the ester bond to the methyl group of the dimethyl terephthalate that is separated here. The greater the amount of methanol released after reaction of dimethyl terephthalate with flame retardant, the greater the (adverse) interaction of the flame retardant with the polymer.

This is done by pulverizing dimethyl terephthalate (DMT) in a porcelain mortar. The flame retardant sample for investigation is mortared for two minutes in an agate mortar. 0.800 g of dimethyl terephthalate and exactly 0.200 g of the flame retardant under investigation are weighed out into a 20 ml ampule. The glass ampule is then sealed with a crimped cap, and the two powders are mixed with one another by rotation of the glass ampule for one minute. This ampule is then heated in an oil bath at 250° C. for 3 minutes, with gentle shaking, after which it is cooled in a 30° C. water bath. The sample is admixed with 10 ml of xylene and stored in a drying oven at 90° C. for one hour. Thereafter the amount of methanol released is determined by gas chromatography.

EXAMPLE 1

In process stage 1, in accordance with table 1, 140 g (1.59 mol) of sodium hypophosphite (NHP) were introduced with 423 g of demineralized water in an $N_2$-purged five-neck flask (dropping funnel, stirrer, reflux condenser, thermometer) and heated to 80° C. Over the course of 6 h, a solution of 11.4 g (0.16 mol) of acrylic acid and 0.57 g of $Na_2S_2O_8$ in 112 g of water was added dropwise.

In process stage 2, the resulting solution, in accordance with table 2, was diluted with 139 g of $H_2O$ and introduced into a Büchi glass autoclave suitable for pressurized gas work. At 120° C. and 4 bar ethylene pressure, approximately 5.3 g of initiator (in solution in 72 g of water) were metered in over the course of 3 h. 81 g of ethylene are taken up.

In process stage 3, in a five-neck, round-bottom flask with stirrer, thermometer, reflux condenser, and two dropping funnels, in accordance with table 3, 564 g of demineralized water are introduced at 85° C. and the solution from process stage 2 is metered in simultaneously with the corresponding amount of aluminum sulfate (table 3) over 2 h.

While still hot, the solution is filtered off on a suction filter and washed with hot demineralized water. After 15-hour drying at 120° C. in a drying oven rendered inert with nitrogen, the product is isolated.

Table 3 gives the yield, residual moisture content (RM), phosphorus content and aluminum content, the amount of alkyl-hydroxyphosphinyl-alkanecarboxylic salt and of telomer, and table 4 gives the DMT value.

As is apparent from the tables, the flame retardant mixture of the invention with alkyl-hydroxyphosphinyl-alkanoic salt based on acrylic acid exhibits much less interaction with the polymer than commercially available aluminum diethylphosphinate. In the $^{31}P$ NMR spectrum, the alkyl-hydroxyphosphinyl-alkanecarboxylic salt shows a chemical shift of 47.5 ppm (multiplet).

EXAMPLE 2

In the same way as for example 1, acrylic acid and sodium hypophosphite are reacted, but over the course of only 2 h. Furthermore, in analogy to example 1, reaction takes place with ethylene and with aluminum sulfate. The reactant quantities and reaction parameters are set out in tables 1, 2, and 3.

In the $^{31}P$ NMR spectrum, the resultant alkyl-hydroxyphosphinyl-alkanecarboxylic salt has a chemical shift of 47.5 ppm.

Table 3 gives the yield, residual moisture content (RM), phosphorus content and aluminum content, and the amount of alkyl-hydroxyphosphinyl-alkanoic salt and of telomer.

EXAMPLE 3

As in example 1, acrylic acid and sodium hypophosphite are reacted in process stage 1, but for a period of 12 h. Furthermore, in analogy to example 1, reaction takes place with ethylene and with aluminum sulfate. The reactant quantities and reaction parameters are set out in tables 1, 2, and 3.

In the $^{31}P$ NMR spectrum, the resultant alkyl-hydroxyphosphinyl-alkanoic salt has a chemical shift of 47.5 ppm.

In spite of the longer reaction time in process stage 1, the amount of acrylic acid adduct is no higher than in example 1: there is no after-reaction.

Table 3 gives the yield, residual moisture content (RM), phosphorus content and aluminum content, and the amount of alkyl-hydroxyphosphinyl-alkanoic salt and of telomer.

EXAMPLE 4

In process stage 1, in accordance with table 1, 140 g of sodium hypophosphite (1.59 mol) were introduced with 384 g of glacial acetic acid and 44.9 g of oleic acid in an $N_2$-purged five-neck flask (dropping funnel, stirrer, reflux condenser, thermometer) and heated to 80° C. Over the course of 4 h a solution of 44.9 g (0.16 mol) of oleic acid and 5.68 g of $Na_2S_2O_8$ in 112 g of water was added dropwise.

The resulting solution is first evaporated to dryness under reduced pressure and thereafter made up to the original mass using demineralized water. An additional 106 g of $H_2O$ were added and the whole was introduced into a Büchi glass autoclave suitable for pressurized gas work. In process stage 2, at 120° C. and 4 bar ethylene pressure, approximately 5.3 g of initiator (in solution in 72 g of water) are metered in over the course of 3 h. 82 g of ethylene are taken up. The resulting solution was introduced with 327 g of Al sulfate solution simultaneously over 2 h into a five-neck, round-bottom flask with stirrer, thermometer, reflux condenser, and two dropping funnels, which had been charged at 85° C. with 564 g of demineralized water. The solution thus obtained, while still hot, is filtered off on a suction filter and washed with hot demineralized water. After 15-hour drying at 120° C. in a drying oven rendered inert using nitrogen, product (alkyl-hydroxyphosphinyl-alkanoic salt) is isolated.

In the $^{31}P$ NMR spectrum, it exhibits a chemical shift of 49.3 ppm (doublet). Table 3 gives the yield, residual moisture content (RM), phosphorus content and aluminum content, and the amount of alkyl-hydroxyphosphinyl-alkanoic salt and of telomer, and table 4 gives the DMT value.

As is apparent from the tables, the flame retardant mixture of the invention with alkyl-hydroxyphosphinyl-alkanecarboxylic salt based on acrylic acid exhibits much less interaction with the polymer than commercially available aluminum diethylphosphinate.

EXAMPLE 5

In analogy to the procedure in example 4, linoleic acid and sodium hypophosphite are reacted, but at 100° C., 8 h, and with bisbenzoyl peroxide initiator. Furthermore, in the other process stages, in analogy to example 1, reaction takes place with ethylene and with aluminum sulfate.

In the $^{31}P$ NMR spectrum, the resultant alkyl-hydroxyphosphinyl-alkanecarboxylic salt has a number of signals in the region of a chemical shift of 49.5-50.8 ppm. The reactant quantities and reaction parameters are set out in tables 1, 2, and 3. Table 3 gives the yield, residual moisture content (RM), phosphorus content and aluminum content, and the amount of alkyl-hydroxyphosphinyl-alkanecarboxylic salt and of telomer.

EXAMPLE 6

In analogy to example 1, maleic anhydride (which hydrolyzes to maleic acid in the aqueous solution) and sodium hypophosphite are reacted, but at 100° C. Furthermore, in analogy to example 1, reaction takes place with ethylene and with aluminum sulfate.

In the $^{31}P$ NMR spectrum, the resultant alkyl-hydroxyphosphinyl-alkanecarboxylic salt has a chemical shift of 42.9 ppm (singlet).

The reactant quantities and reaction parameters are set out in tables 1, 2, and 3. Table 3 gives the yield, residual moisture content (RM), phosphorus content and aluminum content, and the amount of alkyl-hydroxyphosphinyl-alkanoic salt and of telomer.

EXAMPLE 7

In analogy to example 1, fumaric acid and sodium hypophosphite are reacted, but at 100° C. Furthermore, in analogy to example 1, reaction takes place with ethylene and with aluminum sulfate.

The reactant quantities and reaction parameters are set out in tables 1, 2, and 3. Table 3 gives the yield, residual moisture content (RM), phosphorus content and aluminum content, and the amount of alkyl-hydroxyphosphinyl-alkanecarboxylic salt and of telomer.

EXAMPLE 8

In analogy to example 4, methyl oleate and sodium hypophosphite are reacted, but at 118° C. Furthermore, in analogy to example 1, reaction takes place with ethylene and with aluminum sulfate.

The reactant quantities and reaction parameters are set out in tables 1, 2, and 3. In the $^{31}P$ NMR spectrum, the resultant alkyl-hydroxyphosphinyl-alkanecarboxylic ester salt has a number of signals in the region of a chemical shift of around 49 ppm (multiplet).

Table 3 gives the yield, residual moisture content (RM), phosphorus content and aluminum content, and the amount of alkyl-hydroxyphosphinyl-alkanecarboxylic ester salt and of telomer for the resultant product, and also the DMT value in table 4.

The flame retardant mixture of the invention with alkyl-hydroxyphosphinyl-alkanecarboxylic ester salt therefore exhibits much less interaction with the polymer than commercially available aluminum diethylphosphinate.

EXAMPLE 9

As in example 4, in process stage 1, oleic acid and sodium hypophosphite are reacted, but for 6 h. Furthermore, in process stage 2, in analogy to example 1, reaction takes place with ethylene, and in process stage 3 with aluminum sulfate. The quantities and parameters are set out in tables 1-3.

A five-neck, round-bottom flask with stirrer, thermometer, reflux condenser, and two dropping funnels is charged with 435 g of demineralized water at 80° C. The solution from process stage 2 and 456 g of zinc sulfate solution (11.4% Zn) are metered in simultaneously over 2 h. While still hot, the resulting solution is filtered off on a suction filter and washed with hot demineralized water. After 15-hour drying at 120° C. in a drying oven rendered inert with nitrogen, the product is isolated.

In the $^{31}P$ NMR spectrum, the resulting alkyl-hydroxyphosphinyl-alkanecarboxylic salt has a number of signals in the region of a chemical shift of about 49 ppm (multiplet).

Table 3 gives the yield, residual moisture content (RM), phosphorus content and aluminum content, and the amount of alkyl-hydroxyphosphinyl-alkanecarboxylic salt and of telomer for the resultant product, and also the DMT value in table 4. The flame retardant mixture of the invention with alkyl-hydroxyphosphinyl-alkanecarboxylic salt exhibits much less interaction with the polymer than commercial aluminum diethylphosphinate.

EXAMPLE 10

As in example 1, acrylic acid and sodium hypophosphite are reacted. Subsequently, however, reaction takes place with propylene and with aluminum sulfate.

The reactant quantities and reaction parameters are set out in tables 1, 2 and 3. In the $^{31}$P NMR spectrum, the resulting alkyl-hydroxyphosphinyl-alkanecarboxylic salt has a number of signals in the region of a chemical shift of about 46.5 ppm (multiplet).

Table 3 gives the yield, residual moisture content (RM), phosphorus content and aluminum content, and the amount of alkyl-hydroxyphosphinyl-alkanecarboxylic salt and of telomer for the resultant product, and also the DMT value in table 4. The flame retardant mixture of the invention with alkyl-hydroxyphosphinyl-alkanecarboxylic salt based on acrylic acid exhibits much less interaction with the polymer than commercially available aluminum diethylphosphinate.

TABLE 1

| | Alkene- | Process stage 1 | | | | | | | | | |
|---|---|---|---|---|---|---|---|---|---|---|---|
| | carboxylic acid | NHP | | | Glacial acetic | ACA | Initiator | | H$_2$O for initiator | Time | Temperature |
| Example | (ACA) | [mol] | [g] | H$_2$O | acid | [g] | type | [g] | [g] | [h] | [° C.] |
| 1 | Acrylic acid | 1.59 | 140 | 423 | — | 11.4 | Na$_2$S$_2$O$_8$ | 0.57 | 112 | 6 | 80 |
| 2 | Acrylic acid | 1.59 | 140 | 423 | — | 11.4 | Na$_2$S$_2$O$_8$ | 0.57 | 112 | 2 | 80 |
| 3 | Acrylic acid | 1.59 | 140 | 423 | — | 11.4 | Na$_2$S$_2$O$_8$ | 0.57 | 112 | 12 | 80 |
| 4 | Oleic acid | 1.59 | 140 | — | 384 | 44.91 | Na$_2$S$_2$O$_8$ | 5.68 | 112 | 4 | 80 |
| 5 | Linoleic acid | 1.59 | 140 | — | 423 | 8.982 | bisbenzoyl peroxide | 5.78 | — | 8 | 100 |
| 6 | Maleic acid | 1.59 | 140 | 423 | — | 15.6 | Na$_2$S$_2$O$_8$ | 0.38 | 38 | 6 | 100 |
| 7 | Fumaric acid | 1.59 | 140 | 423 | — | 18.4 | Na$_2$S$_2$O$_8$ | 0.38 | 38 | 6 | 100 |
| 8 | Methyl oleate | 1.59 | 140 | — | 423 | 47.14 | Na$_2$S$_2$O$_8$ | 3.03 | 112 | 8 | 118 |
| 9 | Oleic acid | 1.59 | 140 | — | 423 | 44.91 | Na$_2$S$_2$O$_8$ | 5.68 | 112 | 6 | 80 |
| 10 | Acrylic acid | 1.59 | 140 | 423 | — | 11.4 | Na$_2$S$_2$O$_8$ | 0.57 | 56 | 6 | 80 |

TABLE 2

| | | | | Process stage 2 | | | | | |
|---|---|---|---|---|---|---|---|---|---|
| | Process H$_2$O | | Olefin | Initiator | | H$_2$O for initiator | Time | Temperature |
| Example | [g] | Olefin | [g] | type | [g] | [g] | [h] | [° C.] |
| 1 | 139 | Ethylene | 81 | Na$_2$S$_2$O$_8$ | 5.3 | 72 | 2.83 | 120 |
| 2 | 139 | Ethylene | 81 | Na$_2$S$_2$O$_8$ | 5.3 | 72 | 3.00 | 120 |
| 3 | 139 | Ethylene | 81 | Na$_2$S$_2$O$_8$ | 5.3 | 72 | 3.00 | 120 |
| 4 | 106 | Ethylene | 82 | Na$_2$S$_2$O$_8$ | 5.3 | 72 | 3.00 | 120 |
| 5 | 217.8 | Ethylene | 80 | Na$_2$S$_2$O$_8$ | 5.3 | 72 | 3.00 | 120 |
| 6 | 253 | Ethylene | 78 | Na$_2$S$_2$O$_8$ | 4.1 | 55 | 2.58 | 120 |
| 7 | 253 | Ethylene | 77 | Na$_2$S$_2$O$_8$ | 4.1 | 55 | 2.58 | 120 |
| 8 | 103.3 | Ethylene | 80 | Na$_2$S$_2$O$_8$ | 5.3 | 72 | 3.00 | 120 |
| 9 | 105.5 | Ethylene | 82 | Na$_2$S$_2$O$_8$ | 5.3 | 72 | 3.00 | 120 |
| 10 | 139 | Propylene | 127 | Na$_2$S$_2$O$_8$ | 10.6 | 72 | 4.25 | 120 |

TABLE 3

| | | | | | Process stage 3 | | | | | | | |
|---|---|---|---|---|---|---|---|---|---|---|---|---|
| | H$_2$O | Metal salt | | | Time | Temperature | Yield | RM | P | Al (or Zn) | P/Al | AHPOS | Telomer |
| Example | [g] | type | [mol] | [g] | [h] | [° C.] | [%] | [wt %] | [wt %] | [wt %] | [mol/mol] | [wt %] | [wt %] |
| 1 | 564 | Al sulfate | 0.53 | 327 | 2 | 85 | 95.1 | 0.29 | 23.2 | 6.7 | 3.02 | 7.2 | 1.1 |
| 2 | 564 | Al sulfate | 0.53 | 327 | 2 | 85 | 94.8 | 0.19 | 23.1 | 6.7 | 3.00 | 2.5 | 1.1 |
| 3 | 564 | Al sulfate | 0.53 | 327 | 2 | 85 | 94.1 | 0.35 | 23.2 | 6.8 | 2.97 | 7.1 | 1.1 |
| 4 | 564 | Al sulfate | 0.53 | 327 | 2 | 85 | 82.2 | 0.25 | 20.7 | 6.2 | 2.90 | 19.9 | 0.5 |
| 5 | 564 | Al sulfate | 0.53 | 327 | 2 | 85 | 83.1 | 0.25 | 18.8 | 5.5 | 2.98 | 7.4 | 2.9 |
| 6 | 580 | Al sulfate | 0.53 | 327 | 2 | 85 | 86.8 | 0.35 | 23.0 | 6.8 | 2.95 | 4.9 | 1.1 |
| 7 | 580 | Al sulfate | 0.53 | 327 | 2 | 85 | 85.7 | 0.21 | 22.9 | 6.6 | 3.02 | 6.5 | 4.8 |
| 8 | 564 | Al sulfate | 0.53 | 327 | 2 | 85 | 83.4 | 0.20 | 19.7 | 5.7 | 3.01 | 25.5 | 1.1 |
| 9 | 435 | Zn sulfate | 0.795 | 456 | 2 | 80 | 82.6 | 0.41 | 17.7 | 18.8 | 1.98 | 18.9 | 2.2 |
| 10 | 564 | Al sulfate | 0.53 | 327 | 2 | 85 | 94.1 | 0.15 | 19.1 | 5.5 | 3.02 | 7.6 | 1.9 |

Alkyl-hydroxyphosphinyl-organylic acid (AHPOS) - $^{31}$P NMR, chemical shift: aluminum diethylphosphinate 50.24 ppm Al sulfate: 4.37% Al—Zn sulfate: 11.4% Zn

TABLE 4

| Example | DMT [mg MeOH/kg product] |
|---|---|
| 1 | 54 |
| 4 | 42 |
| 8 | 38 |
| 9 | 42 |
| 10 | 56 |
| Commercial aluminum diethylphosphinate 1 (containing 0.5 wt % of telomers) | 150 |
| Commercial aluminum diethylphosphinate 2 (containing 4.8 wt % of telomers) | 160 |

The commercial aluminum diethylphosphinate is free from alkyl-hydroxyphosphinyl-alkanecarboxylic salts. Its DMT value is much higher than that of products of the invention, which therefore exhibit substantially better properties, including in respect of subsequent processing in a polymer.

EXAMPLE 11

Using the product from example 1 (based on acrylic acid), in accordance with the general protocol "Production, Processing and Testing of flame-retardant polymer molding compositions and polymer moldings", a flame-retardant PBT molding is produced, having the best flame retardancy classification V-0 and having better notched impact toughness than commercial aluminum diethylphosphinate (comparison with example 14 from table 5).

EXAMPLE 12

Using the product from example 4 (based on oleic acid), in accordance with the general protocol "Production, Processing and Testing of flame-retardant polymer molding compositions and polymer moldings", a flame-retardant PBT molding is produced, having the best flame retardancy classification V-0 and having better notched impact toughness than commercial aluminum diethylphosphinate (comparison with example 14 from table 5).

EXAMPLE 13

Using the product from example 8 (based on methyl oleate), in accordance with the general protocol "Production, Processing and Testing of flame-retardant polymer molding compositions and polymer moldings", a flame-retardant PBT molding is produced, having the best flame retardancy classification V-0 and having better notched impact toughness than commercial aluminum diethylphosphinate (comparison with example 14 from table 5).

EXAMPLE 14 (COMPARATIVE)

Using commercial aluminum diethylphosphinate, in accordance with the general protocol "Production, Processing and Testing of flame-retardant polymer molding compositions and polymer moldings", a flame-retardant PBT molding is produced, having the best flame retardancy classification V-0 but with a poorer notched impact toughness than with the flame retardant mixtures of the invention (table 5).

EXAMPLE 15 (COMPARATIVE)

Using no flame retardant, a PBT molding is produced according to the general protocol "Production, Processing and Testing of flame-retardant polymer molding compositions and polymer moldings". The moldings do not meet the stated object of flame retardancy, are consumed completely in burning, and do not achieve any flame retardancy classification. The greater notched impact toughness is attributable solely to the lower solids content and higher polymer content (table 5).

TABLE 5

| | | Example | | | | | |
|---|---|---|---|---|---|---|---|
| | | 11 | 12 | 13 | 14 (comp.) | 14a (comp.) | 15 comp.) |
| Product from example 1 | [wt %] | 20.0 | | | | | |
| Product from example 4 | [wt %] | | 20.0 | | | | |
| Product from example 8 | [wt %] | | | 20.0 | | | |
| Commercial aluminum diethylphosphinate 1 | [wt %] | | | | 20.0 | | |
| Commercial aluminum diethylphosphinate 2 | [wt %] | | | | | 20 | |
| PBT | [wt %] | 49.7 | 49.7 | 49.7 | 49.7 | 49.7 | 69.7 |
| GF | [wt %] | 30.0 | 30.0 | 30.0 | 30.0 | 30.0 | 30.0 |
| Wax | [wt %] | 0.3 | 0.3 | 0.3 | 0.3 | 0.3 | 0.3 |
| UL 94 (1.6 mm) | [Classification] | V-0 | V-0 | V-0 | V-0 | V-0 | unclass |
| Notched impact toughness | [J/cm$^2$] | 6.9 | 6.7 | 6.2 | 5.7 | 5.5 | 7.9 |

PBT = Ultradur ® B 4500 natural
GF = PPG glass fiber HP 3786 EC 104.5 MM
Commercial aluminum diethylphosphinate: Exolit ® OP 1230
Wax = Licowax ® E gran., PDEF2 050112
[Classification] = classification;
unclass = burnt up without flame retardancy effect

The invention claimed is:
1. A flame retardant mixture comprising:
as component (A) 30 to 99.9 wt % of dialkylphosphinic salts of the formula (II)

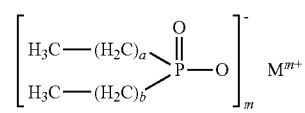

(II)

wherein:
a and b are identical or different and, independently of one another, are each 1 to 9, wherein the carbon chains are linear, branched or cyclic, and
M is Mg, Ca, Al, Sb, Sn, Ge, Ti, Fe, Zr, Zn, Ce, Bi, Sr, Mn, Li, Na, K, a protonated nitrogen base or a combination thereof, and
m is 1 to 4,
as component (B) 0.1 to 70 wt % of a compound of the formula (I)

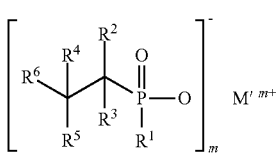

(I)

wherein:
$R^1$ is $C_yH_{2y}\pm i$ with y=2 to 8,
$R^2$, $R^3$, $R^4$ and $R^5$ are identical or different and, independently of one another, are H, $C_xH_{2x+1}$, $C_xH_{2x-1}$, $C_xH_{2x-3}$, $C_xH_{2x}CO_2X$, $C_xH_{2x-2}CO_2X$, $C_xH_{2x-4}CO_2X$, $CO_2X$, $C_xH_{2x}(P(O)(OM)R^1)$, $C_xH_{2x-2}(P(O)(OM)R^1)(CO_2X)$, $CH_2CO_2X$ or a combination thereof,
$R^6$ is $C_xH_{2x}CO_2X$, $C_xH_{2x-2}CO_2X$, $C_xH_{2x-4}CO_2X$, $CO_2X$, $C_xH_{2x}(P(O)(OM)R^1)$, $C_xH_{2x-2}(P(O)(OM)R^1)(CO_2X)$ or $CH_2CO_2X$,
wherein the carbon chains in the groups $R^1$, $R^2$, $R^3$, $R^4$, $R^5$, and $R^6$ are linear, branched, or cyclic,
M' is Mg, Ca, Al, Sb, Sn, Ge, Fe, Ti, Zr, Zn, Ce, Bi, Sr, Mn, Li, Na, K, H, a N-containing cation or a combination thereof,
m is 1 to 4,
x is 1 to 25,
X is H, M or $C_zH_{2z+1}$, and
z is 1 to 8,
where the compounds of the formula (II) and the formula (I) are different compounds.

2. The flame retardant mixture as claimed in claim 1, comprising:
as component (A) 50 to 99.9 wt % of dialkylphosphinic salts of the formula(II), and
as component (B) 0.1 to 50 wt % of a compound of the formula (I).

3. The flame retardant mixture as claimed in claim 1, comprising:
as component (A) 90 to 99.8 wt % of dialkylphosphinic salts of the formula(II), and
as component (B) 0.2 to 10 wt % of a compound of the formula (I).

4. The flame retardant mixture as claimed in claim 1, wherein a and b in formula (II) are identical or different and, independently of one another, are each 1, 2 or 3.

5. The flame retardant mixture as claimed in claim 1, wherein a and b in formula (II) are identical and are each 1.

6. The flame retardant mixture as claimed in claim 1, further comprising telomers.

7. The flame retardant mixture as claimed in claim 6, comprising:
as component (A) 30 to 99.8 wt % of dialkylphosphinic salts of the formula(II),
as component (B) 0.1 to 50 wt % of a compound of the formula (I), and
as component (C) 0.1 to 20 wt % of telomers of the formula (III)

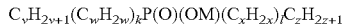

wherein, independently of one another,
v is 2 to 9,
w is 2 to 9,
x is 2 to 9,
z is 2 to 9,
k is 0 to 9,
l is 0 to 9, and
M is H, Mg, Ca, Al, Sb, Sn, Ge, Ti, Zr, Zn, Ce, Bi, Sr, Mn, Li, Na, K or a combination thereof, and the groups $C_vH_{2v+1}$, $(C_wH_{2w})_k$, $(C_xH_{2x})l$, and $C_zH_{2z+1}$ are linear, branched or cyclic, and wherein the compounds of the formulae (I), (II), and (III) are each different.

8. The flame retardant mixture as claimed in claim 7, comprising:
as component (A) 74.5 to 97 wt % of dialkylphosphinic salts of the formula(II),
as component (B) 2.5 to 25.5 wt % of a compound of the formula (I), and
as component (C) 0.5 to 4.8 wt % of telomers of the formula (III).

9. The flame retardant mixture as claimed in claim 6, wherein the telomers comprise ethylbutylphosphinic acid, dibutylphosphinic acid, ethylhexylphosphinic acid, butylhexylphosphinic acid, ethyloctylphosphinic acid, sec-butyl (ethyl)phosphinic acid, 1-ethylbutyl(butyl)phosphinic acid, ethyl(1-methylpentyl)phosphinic acid, di-sec-butylphosphinic acid (di-1-methylpropylphosphinic acid), propyl(hexyl)phosphinic acid, dihexylphosphinic acid, hexyl(nonyl)phosphinic acid, dinonylphosphinic acid, salts thereof or a combination thereof.

10. The flame retardant mixture as claimed in claim 6, wherein the telomers are ethylbutylphosphinic acid, ethyl-n-butylphosphinic acid, ethyl-sec-butylphosphinic acid, propyl(hexyl)phosphinic acid, dihexylphosphinic acid, salts thereof or a combination thereof.

11. The flame retardant mixture as claimed in claim 1, wherein M' in formula (I) is Al, Sb, Sn, Ge, Ti, Fe, Zr, Zn, Ce, Bi, Mn or a combination thereof.

12. The flame retardant mixture as claimed in claim 1, wherein component (B) comprises Al, Zn, Fe and/or Ti salts of carboxyoctadecyl(ethyl)phosphinic acid, of methylcarboxyoctadecyl(ethyl)phosphinic acid, of carboxyethyl(ethyl)phosphinic acid, of 1,2-dicarboxyethyl(ethyl)phosphinic acid, of 2,3-dicarboxypropyl(ethyl)phosphinic acid, or a combination thereof.

13. The flame retardant mixture as claimed in claim 1, wherein component (B) comprises Al and/or Zn salts of carboxyoctadecyl(ethyl)phosphinic acid, of methylcarboxyoctadecyl(ethyl)phosphinic acid, of carboxyethyl(ethyl)phosphinic acid, of 1,2-dicarboxyethyl(ethyl)phosphinic acid, of 2,3-dicarboxypropylphosphinic acid, or a combination thereof.

14. The flame retardant mixture as claimed in claim 1, further comprising additives selected from the group consisting of antioxidants, antistats, blowing agents, other flame retardants, heat stabilizers, impact modifiers, process auxiliaries, lubricants, light stabilizers, antidripping agents, compatibilizers, reinforcing agents, fillers, seed-forming agents, nucleating agents, laser marking additives, hydrolysis stabilizers, chain extenders, color pigments, plasticizers, plastifying agents and combinations thereof.

15. The flame retardant mixture as claimed in claim 1, having a mean particle size $d_{50}$ of 0.02-900 µm, a bulk density of 100 to 680 g/L, and a color value (Hunter L value) of 93 to 97.

16. The flame retardant mixture as claimed in claim 1, having a mean particle size $d_{50}$ of 0.1-110 µm and a bulk density of 250 to 620 g/L.

17. A process for producing a flame retardant mixture as claimed in claim 1, comprising the steps of:
   a) reacting a water-soluble salt of hypophosphorous acid or hypophosphorous acid in a ratio of 100 mol:0.1 mol to 50 mol:50 mol with an alkenecarboxylic acid,
   b) reacting the product from step a) with an olefin in the ratio of 100 mol of phosphinic acid source: 1800 to 50 mol of olefin,
   c) reacting the product from step b) with a metal salt to give a flame retardant mixture composed of dialkylphosphinic salts of the formula (II) with a compound of the formula (I).

18. A process for producing a flame retardant mixture as claimed in claim 1, comprising the steps of:
   a) reacting a salt of hypophosphorous acid having a solubility in water of less than 10 g/100 g, or hypophosphorous acid, in a ratio of 100 mol:0.1 mol to 50 mol:50 mol with an alkenecarboxylic acid and
   b) reacting the product from step a) with an olefin in the ratio of 100 mol of water-soluble salt of hypophosphorous acid or hypophosphorous acid: 1800 to 50 mol.

19. A process for producing a flame retardant mixture as claimed in claim 1, comprising the steps of:
   a) reacting a water-soluble salt of hypophosphorous acid or hypophosphorous acid in a ratio of 100 mol:0.1 mol to 50 mol:50 mol with an alkenecarboxylic acid,
   b) reacting the product from step a) with an olefin in the ratio of 100 mol of water-soluble salt of hypophosphorous acid or hypophosphorous acid: 99.9 to 50 mol of olefin,
   c) reacting the product from step b) with a metal salt to give the flame retardant mixture, and
   d) physically admixing telomers.

20. A flame retardant, a flame retardant for clear varnishes and intumescent coatings, as a flame retardant for wood and other cellulosic products, a reactive and/or nonreactive flame retardant for polymers, a flame-retardant polymer molding composition, a flame-retardant polymer molding, a flame-retardant polyester fabric, a flame-retardant pure and blended cellulose fabric, an intermediate, a binder, a crosslinker and/or accelerator in the curing of epoxy resins, polyurethanes, and unsaturated polyester resins, a polymer stabilizer, a crop protectant, a sequestrant, a mineral oil additive, a corrosion inhibitor, a laundry detergent, a cleaning product or electronic product comprising a flame retardant mixture as claimed in claim 1.

21. A plug connector, a current-bearing component in power distributors (residual current protection), a circuit board, a power plug, a circuit breaker, a lamp housing, an LED lamp housing, a capacitor housing, a coil element, a ventilator, a grounding contact, a plug, a housing for plugs, a cable, a flexible printed circuit board, a charging cable, a motor cover, or a textile coating comprising a flame retardant mixture as claimed in claim 1.

22. A flame-retardant thermoplastic or thermoset polymer molding composition comprising:
   0.5 to 45 wt % of one or more flame retardant mixture as claimed in claim 1,
   10 to 95 wt % of a thermoplastic polymer, a thermoset polymer or a mixture thereof,
   0 to 55 wt % of additives, and
   0 to 55 wt % of filler, reinforcing materials or a combination thereof,
the sum of the components being 100 wt %.

23. A flame-retardant thermoplastic or thermoset polymer molding, film, filament or fiber comprising:
   5 to 30 wt % of one or more flame retardant mixtures as claimed in claim 1,
   20 to 95 wt % of a thermoplastic polymer, thermoset polymer or a mixture thereof,
   5 to 55 wt % of additives, and
   10 to 55 wt % of filler, reinforcing materials or a combination thereof,
the sum of the components being 100 wt %.

* * * * *